United States Patent [19]

Francoeur, Sr. et al.

[11] Patent Number: 5,569,521

[45] Date of Patent: Oct. 29, 1996

[54] FLEXIBLE CLEANING PAD

[76] Inventors: Normand Francoeur, Sr.; Normand Francoeur, Jr.; Marc-André Francoeur, all of 992, Roseline, Laval, Quebec, Canada, H7R 4V1

[21] Appl. No.: 426,174

[22] Filed: Apr. 21, 1995

[51] Int. Cl.⁶ ........................................ B32B 9/10
[52] U.S. Cl. .................. 428/171; 428/85; 428/96; 428/126; 428/172; 428/192; 428/286; 428/287; 428/296; 428/409; 252/91; 252/174; 51/400; 15/118; 451/533
[58] Field of Search .................. 428/296, 171, 428/172, 409, 126, 96, 85, 192, 287, 286, 288; 15/118; 51/400; 252/91, 94

[56] References Cited

U.S. PATENT DOCUMENTS

| | | | |
|---|---|---|---|
| 3,699,672 | 10/1972 | Sims | 36/7.7 |
| 4,372,867 | 2/1983 | Taragos | 252/91 |
| 4,713,274 | 12/1987 | Minor | 428/40 |
| 4,993,099 | 2/1991 | Emura | 15/118 |
| 5,025,596 | 6/1991 | Heyer et al. | 51/400 |

Primary Examiner—Patrick Ryan
Assistant Examiner—Abraham Bahta

[57] ABSTRACT

A flexible cleaning pad for removing dry particles such as lint, dust and the like from surfaces such as clothing, upholstery and the like. The pad has a hand contacting sheet made of flexible material and an opposed cleaning sheet also made of flexible material. Both the hand contacting sheet and the cleaning sheet are adhesively fixed to an intermediate core sheet by an adhesive material. The core sheet is made of a substantially rigid yet bendable material presenting resilient properties. The adhesive material is chosen so as to also presents reselient properties. A strap extending across the hand contacting sheet allows the pad to be secured in the palm of the hand of an intended user. The core sheet provides structural rigidity to the pad while allowing the latter to be bended. The core sheet also allows the pad to spring back to a substantially flat configuration when no external force is applied to the pad. The use of an adhesive material having resilient characteristics allow the hand contacting sheet and the cleaning sheet to slide relatively to the core layer when the pad is bended thus preventing warping of the latter.

17 Claims, 3 Drawing Sheets

FLEXIBLE CLEANING PAD

BACKGROUND—FIELD OF THE INVENTION

The present invention relates to the field of cleaning accessories and is particularly concerned with a flexible cleaning pad particularly adapted to remove dry particles such as lint, hair, dandruff and the like from clothing, upholstery and the like.

BACKGROUND—PRIOR ART

The field of cleaning devices is replete with brushes of different types for removing dry particles from various surfaces. Most conventional devices used for removing dry particles from articles of clothing comprise a piece of velvet-like material mounted on a rigid frame which extends integrally into a rigid handle. This type of device, although efficient, suffers from at least three major drawbacks.

First, the rigid nature of both the handle and the frame does not allow the device to be bended and thus prevents the latter from being carried conveniently, for example in the pocket of an intended user.

Second, the rigid nature of the frame prevents the velvet-like component of the cleaning device from embracing the contour of the surface being cleaned, as for example when the shoulder portion of a dress is being cleaned.

Third, the conventional devices for removing dry particles are typically quite bulky and thus cumbersome both to store and to carry around.

SUMMARY OF THE INVENTION

Accordingly, it is an object of the present invention to provide an improved dry particle removing pad. The dry particle removing in accordance with the present invention will be of a flexible nature so as to allow the pad to be easily carried into the pocket of an intended user in a folded configuration.

The dry particle removing pad in accordance with the present invention is adapted to provide an intended user with the dust collecting properties of a flexible material such as velvet or the like without the disadvantage of having the sheet of velvet-like material mounted on a rigid frame.

The dry particle removing pad in accordance with the present invention will be particularly suited to efficiently remove dry particles such as hair, lint, dandruff and the like from surfaces such as clothing, shoes, gloves, upholstery and the like.

The dry particle removing pad in accordance with the present invention will be ergonomical and easy to use. The dry particle removing pad in accordance with the present invention will conform to conventional forms of manufacturing and be of simple construction, as to provide a dry particle removing pad which will be economically feasible and long lasting.

In accordance with an embodiment of the present invention, there is provided a cleaning pad comprising a first sheet of flexible material, the first sheet defining a hand contacting surface, an opposed first sheet fixing surface and a first sheet peripheral edge; a second sheet of flexible material, the second sheet defining a second sheet cleaning surface, an opposed second sheet fixing surface and a second sheet peripheral edge, the second sheet cleaning surface having a dust collecting texture; a third sheet, the third sheet defining a third sheet fixing surface, an opposed second sheet fixing surface and a third sheet peripheral edge, the third sheet being made of a substantially rigid yet bendable and resilient material; a first layer of adhesive material adhesively fixing the first sheet fixing surface to the third sheet first fixing surface; a second layer of adhesive material adhesively fixing the second sheet fixing surface to the third sheet second fixing surface; the first and second layers of adhesive material having resilient characteristics, the resilient characteristics of the first and second layers of adhesive material allowing a relative sliding displacement between the third sheet and the first and second sheets when the pad is being bended.

Preferably, the first sheet peripheral edge, the second sheet peripheral edge and the third sheet peripheral edge define a common pad peripheral edge and; the pad further comprises a bordering strip wrapped around the pad peripheral edge, the bordering strip being fixed to both the hand contacting surface and the cleaning surface adjacent the pad peripheral edge.

Conveniently, the bordering strip is fixed to the hand contacting surface and the cleaning surface by a bordering seam.

Conveniently, the pad further comprises a retaining strap, the retaining strap having an elongated configuration defining a strap first longitudinal end and a strap second longitudinal end, the strap extending substantially across the hand contacting surface with the strap first longitudinal end and the strap second longitudinal end being respectively fixed to opposed sides of the hand contacting surface adjacent the first sheet peripheral edge.

Preferably, the strap is made of a substantially elastomeric material.

Conveniently, the strap is fixed to the hand contacting surface by a pair of strap seams.

Preferably, the pad is sized so as to be fittingly insertable inside the palm of the hand of an intended user.

Conveniently, the pad has a substantially flat and oval general configuration.

Preferably, the third sheet is made of a high molecular weight, high density polyethylene, copolymer having stress crack resistance combined with high impact strength and rigidity.

Conveniently, the third sheet has a thickness substantially in the range of 0.55 thousands of an inch.

Preferably, the first sheet is made of cotton.

Conveniently, the second sheet is made of velvet.

Preferably, the first and second layers are both made of a rubber based glue.

Conveniently, the bordering strip is made of nylon.

BRIEF DESCRIPTION OF THE DRAWINGS

An embodiment of the present invention will now be described in reference to the following drawings in which.

DETAILED DESCRIPTION

Figure 1:
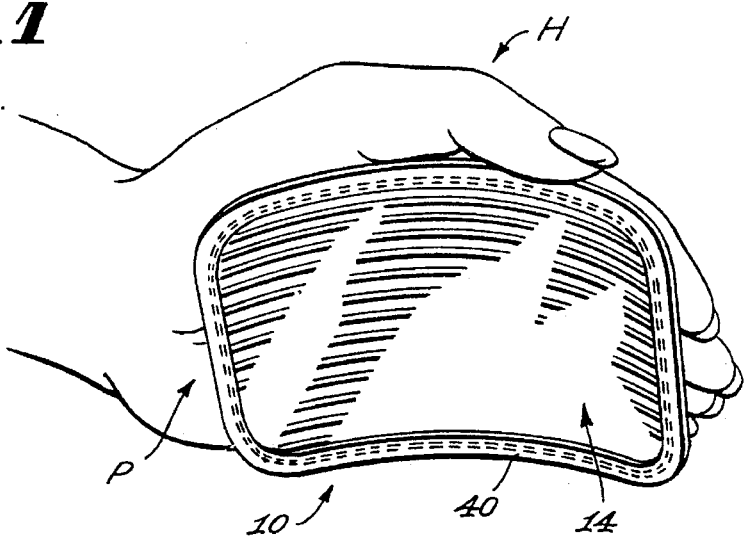
FIG. 1: in a front perspective view, illustrates a dry particle removing pad in accordance with an embodiment of the present invention inserted into the palm of the hand of a user.
Figure 2:
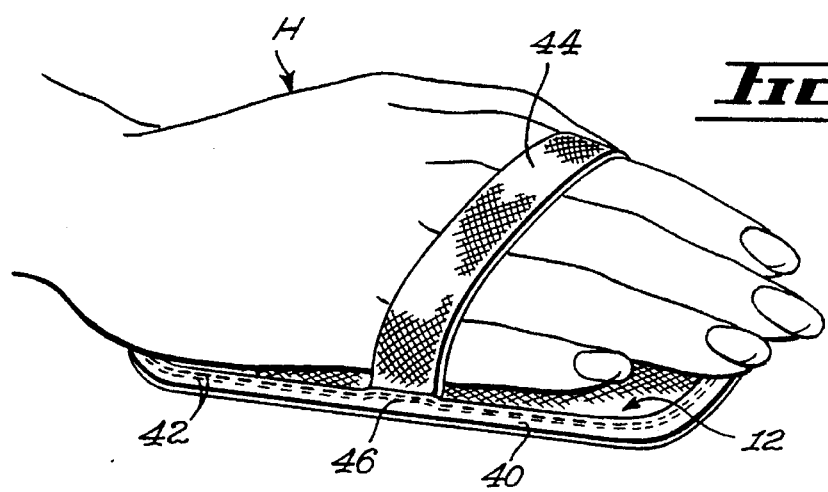
FIG. 2: in a rear perspective view, illustrates a dry particle removing pad in accordance with an embodiment of the present invention secured into the palm of a user by a securing strap.
Figure 3:
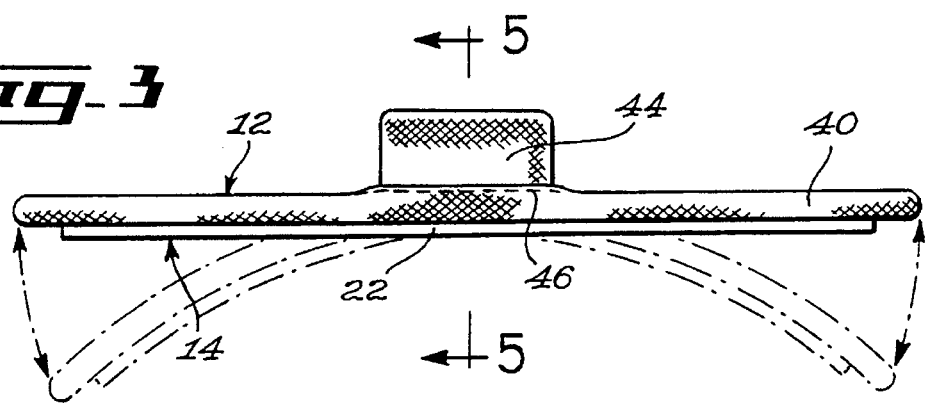
FIG. 3: in an elevational view, illustrates a dry particle removing pad in accordance with an embodiment of the present invention.
Figure 4:
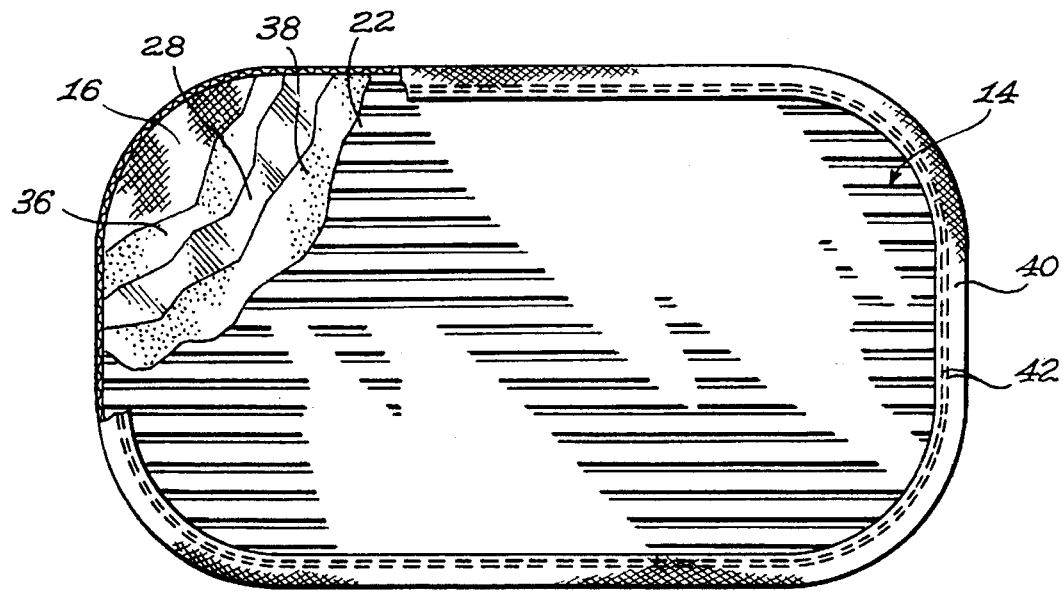
FIG. 4: in a front view with sections taken-out, illustrates a dry particle removing pad in accordance with an embodiment of the present invention.

Referring to FIG. 1, there is shown a dry particle removing pad 10 in accordance with an embodiment of the present invention. The pad 10 has a substantially flat general configuration. Although FIGS. 1 through 6 illustrate the pad 10 having a substantially oval peripheral edge, it should be understood that the peripheral edge of the dry particle removing pad 10 could be of a different geometrical shape without departing from the scope of the present invention.

The pad 10 has a hand contacting surface 12 and an opposed cleaning surface 14. As shown more specifically in FIGS. 5 and 6, the grasping surface 12 is formed by a correspondingly-shaped first sheet 16 of flexible material. The first sheet 16 is typically made of a non-allergenic and soft yet relatively wear resistant material such as cotton or the like. The first sheet 16 defines both the hand contacting surface 12 and an opposed first sheet fixing surface 18. The first sheet 16 has a first sheet peripheral edge 20.

The cleaning surface 14 is formed by a correspondingly-shaped second sheet 22 of flexible material. The second sheet 22 is preferably made of a material having raised piles and known for its dust collecting properties such as velvet or the like.

Figure 5:
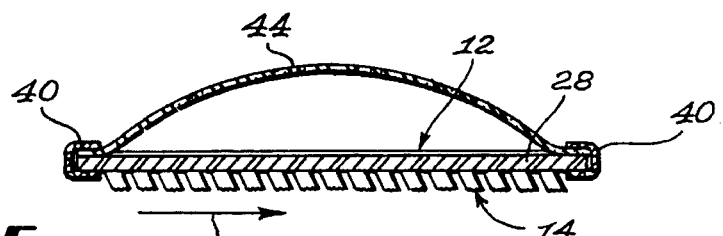
FIG. 5: in a cross-sectional view taken along arrows 5—5 of FIG. 3, illustrates a dry particle removing pad in accordance with an embodiment of the present invention in a flat configuration.
Figure 6:
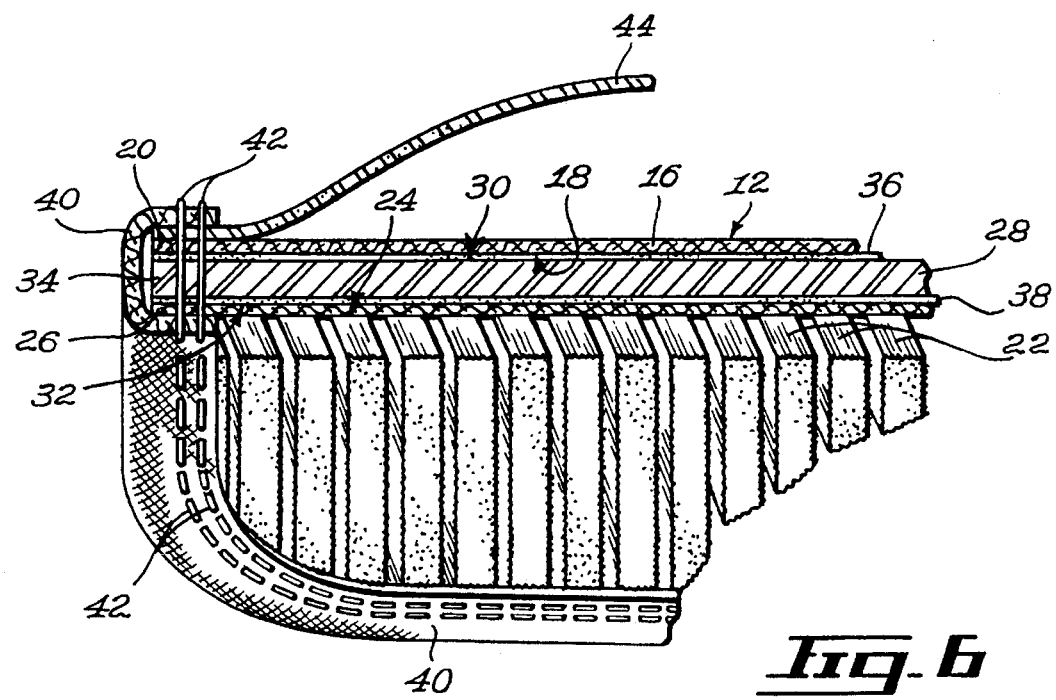
FIG. 6: in a partial cross-sectional view taken along arrows 5—5 of FIG. 3, illustrates a section of a dry particle removing pad in accordance with an embodiment of the present invention in a flat configuration.
Figure 7:
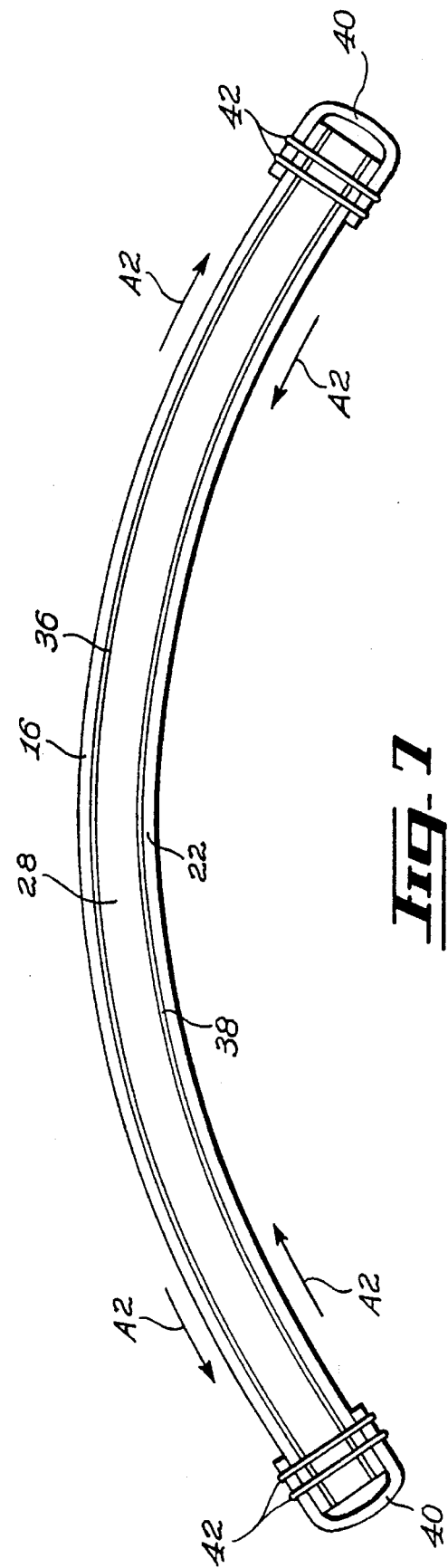
FIG. 7: in a schematic cross-sectional view taken along arrows 5—5 of FIG. 3, illustrates a dry particle removing pad in accordance with an embodiment of the present invention in a partially folded configuration.

When the material is made of raised piles as illustrated more specifically in FIGS. 5 and 6, the material forms a set of strips which are angled relatively to their respective bases. The angle formed by the strips allows the cleaning surface to collect dry particles more efficiently when the brush is move relatively to the article being cleaned in a direction opposite the angle formed by the strips. This direction is indicated in FIG. 5 by the arrow A1. Conversely, when the brush is moved in the opposite direction, the removed dry particles have a tendency to be wiped-off the brush.

In an alternative embodiment of the invention, the second sheet 22 is made of a substantially flexible material known not only for its dust collecting properties but also for its hair collecting properties such as an elastomeric material or the like.

The second sheet 22 defines both the cleaning surface 14 and an opposed second sheet fixing surface 24. The second sheet 22 has a second sheet peripheral edge 26.

Both the first sheet 16 and the second sheet 22 are adhesively fixed to a third sheet 28. The third sheet 28 is made of a substantially thin strip of relatively rigid yet bendable and resilient material. The material must have the capacity to spring back to its original configuration after being bended by an external force.

The material of which the third sheet 28 is preferably made of typically consists of a high molecular weight, high density polyethylene, copolymer having stress crack resistance combined with high impact strength and rigidity. Typically, the third sheet 28 has a thickness substantially in the range of 0.55 thousands of an inch.

The third sheet 28 defines a third sheet first surface 30 and a third sheet second surface 32. The third sheet 28 has a third sheet peripheral edge 34.

The first sheet 16, the second sheet 22 and the third sheet 28 are all substantially similarly configured and sized. As illustrated in FIG. 1, the first sheet 16, the second sheet 22 and the third sheet 28 are typically configured so that the pad 10 fits into the palm P of the hand H of an intended user. In yet another alternative embodiment of the invention, the pad 10 is sized so as to exceed the palm of a human hand.

A first layer 36 of adhesive material bounds the first sheet fixing surface 18 to the third sheet first surface 30, while a second layer 38 of adhesive material bounds the second sheet fixing surface 34 to the third sheet second surface 32.

The first layer 36 and the second layer 38 are preferably formed of an adhesive which bounds surfaces while still presenting resilient characteristics, such as a rubber based glue or the like.

This type of adhesive is preferred over a contact-type glue or a epoxy which have a tendency to become dry and brittle once they are in contact with the surface to be bounded. If the first layer 36 and the second layer 38 were formed of glues of the hereinabove mentioned types, they would have a tendency to crack and to separate from the bounded surface when subject to a bending stress.

Since a rubber based glue is used, and since the latter presents resilient characteristics, the first layer 36 and the second layer 38 will allow for certain relative displacement between the third sheet 28 and the first and second sheets when the pad 10 is subject to a bending stress. This characteristic is illustrated in FIG. 6 which illustrates the pad 10 in a partially bended configuration.

FIG. 6 illustrates the cleaning surface 14 being in a substantially concave configuration while the hand contacting surface 12 is in a substantially convex configuration. As can be seen, there exist a relative displacement indicated by the arrows A2 between the first sheet 16, the second sheet 22 and the third sheet 28.

A bordering strip 40 is wrapped around the peripheral edge of the sandwiched-structure formed by the first sheet 16, the first layer 36, the third sheet 28, the second layer 38 and the second sheet 22.

The bordering strip 40 is formed of a flexible yet wear resistant material such as nylon, polyesther, or the like. The bordering strip 40 is fixed to the sandwiched-structure by a first seam 2. A substantially elongated retaining strap 44 extends transversally across the hand contacting surface 12 along a direction which corresponds substantially to the smaller generating axis of the oval configuration.

The retaining strap 44 is fixed at both of its longitudinal ends to opposite sides of the hand contacting surface 12 adjacent the bordering strip 34 by a second seam 46. The retaining strap 44 is preferably made of a relatively resilient material such as an elastomeric material or the like.

The embodiments of the invention in which an exclusive privilege or property is claimed are defined as follows:

1. A cleaning pad comprising:

a first sheet of flexible material, said first sheet defining a hand contacting surface, an opposed first sheet fixing surface and a first sheet peripheral edge;

a second sheet of flexible material, said second sheet defining a second sheet cleaning surface, an opposed second sheet fixing surface and a second sheet peripheral edge, said second sheet cleaning surface having a dry particle collecting texture;

a third sheet, said third sheet defining a third sheet fixing surface, an opposed second sheet fixing surface and a third sheet peripheral edge, said third sheet being made of a substantially rigid yet bendable and resilient material;

a first layer of adhesive material adhesively fixing said first sheet fixing surface to said third sheet first fixing surface;

a second layer of adhesive material adhesively fixing said second sheet fixing surface to said third sheet second fixing surface; said first and second layers of adhesive material having resilient characteristics, said resilient characteristics of said first and second layers of adhesive material allowing a relative sliding displacement between said third sheet and said first and second sheets when said pad is being bended.

2. A pad as recited in claim 1 wherein said first sheet peripheral edge, said second sheet peripheral edge and said third sheet peripheral edge define a common pad peripheral edge and; said pad further comprises a bordering strip wrapped around said pad peripheral edge, said bordering strip being fixed to both said hand contacting surface and said cleaning surface adjacent said pad peripheral edge.

3. A pad as recited in claim 2 wherein said bordering strip is fixed to said hand contacting surface and said cleaning surface by a bordering seam.

4. A pad as recited in claim 1 further comprising a retaining strap, said retaining strap having an elongated configuration defining a strap first longitudinal end and a strap second longitudinal end, said strap extending substantially across said hand contacting surface with said strap first longitudinal end and said strap second longitudinal end being respectively fixed to opposed sides of said hand contacting surface adjacent said first sheet peripheral edge.

5. A pad as recited in claim 4 wherein said strap is made of a substantially elastomeric material.

6. A pad as recited in claim 5 wherein said strap is fixed to said hand contacting surface by a pair of strap seams.

7. A pad as recited in claim 1 wherein said pad is sized so as to be fittingly insertable inside the palm of the hand of an intended user.

8. A pad as recited in claim 1 wherein said pad has a substantially flat and oval general configuration.

9. A pad as recited in claim 1 wherein said third sheet is made of a high molecular weight, high density polyethylene, copolymer having stress crack resistance combined with high impact strength and rigidity.

10. A pad as recited in claim 9 wherein said third sheet has a thickness substantially in the range of 0.55 thousands of an inch.

11. A pad as recited in claim 1 wherein said first sheet is made of cotton.

12. A pad as recited in claim 1 wherein said second sheet is made of velvet.

13. A pad as recited in claim 1 wherein said first and second layers are both made of a rubber based glue.

14. A pad as recited in claim 3 wherein said bordering strip is made of nylon.

15. A pad as recited in claim 1 wherein said second sheet is made of an elastomeric material.

16. A pad as recited in claim 3 wherein said bordering strip is made of polyesther.

17. A pad as recited in claim 1 wherein said pad is sized so as to exceed the size of the palm of the hand of an intended user.

\* \* \* \* \*